United States Patent
Frank

(10) Patent No.: US 6,588,705 B1
(45) Date of Patent: Jul. 8, 2003

(54) SECURITY SCREEN DEVICE FOR PROTECTING PERSONS AND PROPERTY

(75) Inventor: M. William Frank, Boulder, CO (US)

(73) Assignee: Skepsis Incorporated, Boulder, CO (US)

( * ) Notice: Subject to any disclaimer, the term of this patent is extended or adjusted under 35 U.S.C. 154(b) by 40 days.

(21) Appl. No.: 09/989,201

(22) Filed: Nov. 21, 2001

(51) Int. Cl.$^7$ .................................................. B64C 1/10
(52) U.S. Cl. .................... 244/118.5; 244/121; 244/129.5
(58) Field of Search ............................ 244/117 R, 119, 244/118.5, 121, 129.1, 129.5, 129.4; 52/3–5; 89/36.11, 36.02; 160/7, 243, 268.1; 169/48

(56) References Cited

U.S. PATENT DOCUMENTS

| | | | |
|---|---|---|---|
| 1,234,873 A | * 7/1917 | Clampitt | 169/48 |
| 2,276,700 A | * 3/1942 | Provenzano | 244/118.5 |
| 3,423,121 A | * 1/1969 | Lipkin | 244/121 |
| 3,687,185 A | * 8/1972 | Singer | 160/33 |
| 4,077,474 A | * 3/1978 | Hattori | 169/48 |
| 4,121,790 A | * 10/1978 | Graham | 244/118.5 |
| 4,342,355 A | 8/1982 | Geller et al. | |
| 4,597,549 A | * 7/1986 | Ryan | 244/118.5 |
| 4,781,101 A | 11/1988 | Zevuluni et al. | |
| 5,022,452 A | 6/1991 | Burrell | |
| 5,195,594 A | * 3/1993 | Allen et al. | 169/48 |
| 5,307,725 A | 5/1994 | Desmond et al. | |
| 5,555,683 A | 9/1996 | Schroeder | |
| 5,703,316 A | 12/1997 | Madden, Jr. | |
| 5,747,721 A | * 5/1998 | Speakes et al. | 244/121 |
| 5,811,719 A | 9/1998 | Madden, Jr. | |
| 5,829,200 A | * 11/1998 | Jones et al. | 169/48 |
| 5,939,658 A | 8/1999 | Muller | |
| 6,125,941 A | * 10/2000 | Lokken | 169/48 |
| 6,161,462 A | 12/2000 | Michaelson | |
| 6,181,089 B1 | 1/2001 | Kovach et al. | |
| 6,286,579 B1 | 9/2001 | Gottschalk | |
| 6,286,785 B1 | * 9/2001 | Kitchen | 244/121 |

FOREIGN PATENT DOCUMENTS

EP 0 880 004 A3 11/1998

* cited by examiner

Primary Examiner—Galen L. Barefoot
(74) Attorney, Agent, or Firm—Emery L. Tracy

(57) ABSTRACT

A security screen device for protecting persons and property is provided. The security screen device comprises an enclosed screen housing defining a screen receiving area. A screen material made of high strength fibers is receivable within the screen housing in an undeployed condition with the screen material having a first edge and a second edge. The first edge is secured within the screen receiving area and a weighted bar is secured to the second edge of the screen material. An activation mechanism opens one side of the screen housing releasing the screen material from the housing into a deployed condition such that the second edge of the screen material travels in a direction generally away from the enclosed screen housing thereby pulling the screen material from the enclosed screen housing.

18 Claims, 3 Drawing Sheets

SECURITY SCREEN DEVICE FOR PROTECTING PERSONS AND PROPERTY

BACKGROUND OF THE INVENTION

1. Field of the Invention

This invention relates generally to security screen devices for protecting persons and property and, more particularly, it relates to security screens which can be activated upon occurrence of a predetermined event to protect persons and property from injury and/or damage that could be inflicted by high velocity projectiles such as bullets, shrapnel, and fragments resulting from deliberate or accidental explosions.

2. Description of the Prior Art

In these uncertain times of increased terrorism and crime, it has become more difficult to provide protection of persons and property in response to a life-threatening event. The need to protect persons during performance of their jobs and duties is of utmost importance in an effort to save lives and reduce massive property destruction. Conventional devices such as bulletproof vests, blankets, and glass, have been provided in an effort to protect these persons during a crisis event. Unfortunately, these devices are typically quite heavy and cumbersome and require these devices to be permanently deployed in anticipation of the event. When protecting persons and property within vehicles, aircraft, or buildings, use of these devices which must be deployed at all times substantially detract from the aesthetic appearance of the property and often restrict free access.

Accordingly, there exists a need for a security screen device for protecting persons and property which effectively maintains the safety of the person and property when needed, without permanently blocking access to the area. Additionally, a need exists for a security screen device for protecting persons and property which is deployable and retractable to minimize aesthetic deteriation of the protected property. Furthermore, there exists a need for a security screen device for protecting persons and property which is automatically deployable upon command or the occurrence of a predetermined event to protect the person and/or property.

SUMMARY

The present invention is a security screen device for protecting persons and property. The security screen device comprises an enclosed screen housing defining a screen storage area and having one side hinged and latched to allow deployment of the screen. A screen material is receivable within the screen housing in an undeployed condition with the screen material having a first edge and a second edge. The first edge is secured within the screen receiving area and the second edge is attached to a weighted bar. Activation means open the latches holding the hinged side of the housing, allowing the weighted bar and screen to be deployed such that the bar and the screen material travel in a direction generally away from the housing. Movement of the weighted bar and screen material is accomplished by gravity or some powered mechanical means.

Additionally, the present invention includes a system for inhibiting persons from entering a cockpit in an aircraft. The system comprises a container mounted near the ceiling of the cockpit. U-shaped guide channels are secured to the container adjacent the walls of the cockpit and extend from the container to the floor of the cockpit. A projectile resistant material and locking bar is receivable within the container in an undeployed condition and movable within the guide channels into a deployed condition. Activation means automatically activating the material from the undeployed condition to the deployed condition upon the occurrence of a command or some other predetermined event.

The present invention further includes a method for automatically deploying a security screen upon the occurrence of a command or some other predetermined event. The method comprises providing a projectile resistant screen material having a first edge and a second edge, securing the first edge of screen material within an enclosed container, and the second edge attached to a weighted rod, also within the enclosed container. The weighted rod has a first end and a second end and the screen material and the weighted rod are automatically deployed from the container upon the occurrence of a predetermined event. The first end of the weighted rod travels through one of the U-shaped channels and the second end travels through the opposite U-shaped channel.

DETAILED DESCRIPTION OF THE PREFERRED EMBODIMENTS

Figure 1:
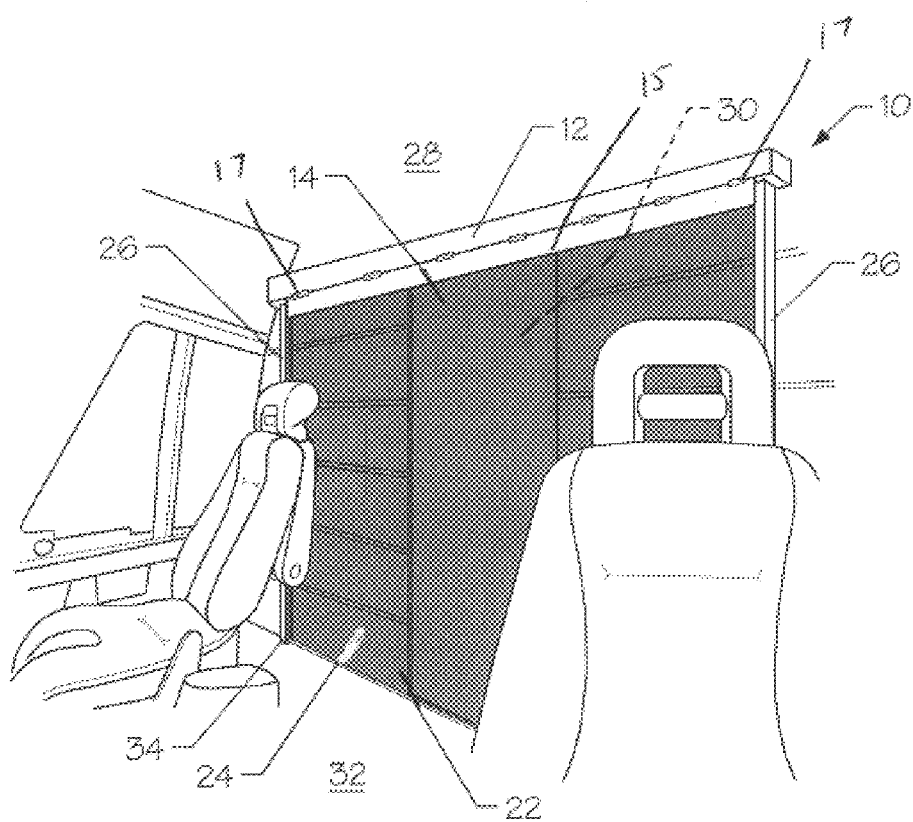
FIG. 1 is a perspective view a security screen device for protecting persons and property, constructed in accordance with the present invention, with the security screen device being deployed within a cockpit of an aircraft.

As illustrated in FIG. 1, the present invention is a security screen device, indicated generally at 10, for protecting persons and property from projectiles and/or explosive fragments. The security screen device 10 is designed to protect areas or walls, windows, and doorways that would not normally be sufficient structural strength to withstand high velocity impacts. The security screen device 10 can be configured for fixed areas or attached to mobile devices and vehicles. In fact, the security screen device 10 of the present invention can be used to protect in a variety of protection scenarios including, but not limited to, pilots within a cockpit of an aircraft, office personnel within an office or other work environment, occupants of a private residence, police or other emergency personnel when entering a potentially dangerous situation, military personnel within a military vehicle and the fuel supply of the military vehicle, drivers and passengers on buses or other mass transit vehicles, important officials and dignitaries within limousines or other vehicles and the fuel supply of these vehicles, etc.

The security screen device 10 can be permanently mounted over spaces, windows, doors, or easily penetrated walls, but are preferably mounted for rapid deployment in the event of an emergency situation. For rapid deployment modes, the security screen device 10 of the present invention includes a substantially enclosed screen housing 12 mounted directly to the property and a screen material 14 stored within and deployable from the screen housing 12 through a hinged door 15, having hinges 17, formed in the screen housing 12. The hinged door is maintained in position, until released, by a latch mechanism or a pin roller.

The screen material 14 has a first edge 20 and a second edge 22 with the first edge 20 secured within the screen housing 12. The screen material 14 can be rolled or accordion folded into the screen housing 12 with a deployment mechanism or device 18 that provides automatic rapid release of the screen material 14 to drop over the desired vertical surface.

A weighted bar or rod 24 is secured to the second edge 22 of the screen material 14 and provides the screen material 14 with sufficient weight to move quickly toward the ground or floor when deployed from the screen housing 12. The screen housing 12 maintains the screen material 14 in a folded or rolled configuration prior to deployment of the screen material 14.

In an alternative embodiment allows the weighted bar 24 to be suspended outside the screen housing 12 with the screen material 14 extending out through a slot in one side of the screen housing 12.

In certain embodiments, the screen housing 12 further includes a screen track 26 secured to the screen housing 12. The screen track 26 preferably comprises channels at both sides of the screen housing 12 which constrain and guide the edges of the screen material 14 and the weighted bar or rod 26 and, if appropriate, to lock the weighted bar or rod 26 in position. Gravity deployment actuation may be accomplished with manual, electromagnetic, or electrochemical actuators mounted and/or connected to the screen housing 12. For other configurations, non-vertical orientations, or for higher speed actuation, gas generators (similar to automotive air bags), pneumatic, or hydraulic means can be used to deploy the screen material 14 from the screen housing 12. Initiation of the deployment actuators can be accomplished by a manual switch, a radio control or a microprocessor located in or connected to the screen housing 12 that can automatically respond to physical shock, audio sound profiles like those produced by high speed projectiles, gunshots, breaking glass, or voice commands (using word recognition software).

As mentioned above, the screen track 26 is preferably a pair of substantially U-shaped channels extending generally away from and perpendicular to the screen housing 12. As the screen material 14 is deployed, the edges of the weighted bar or rod 24 and the screen material 14 stored within the screen housing 12 travel in a substantially downward manner along and within the screen track 26. The screen track 26 enables the screen material 14 to inhibit undesired persons from pushing or otherwise forcing the screen material 14 open to gain access to the protected area. Actual examples of mounting the screen housing 12 and screen track 26 to property and deployment of the screen material 14 will be discussed in greater detail below.

The screen material 14 of the security screen device 10 of the present invention is preferably comprised of one or more layers of high tensile strength fabric, rigid folding panels or a combination of the fabric and panels to shield, deflect, vaporize and/or dissipate the kinetic energy of projectiles or explosive fragments. The screen material 14 can be constructed from a wide range of materials such as Kevlar, carbon fiber, and/or glass fibers, epoxies, hybrid combinations of materials weaves, weights, and layering options thereby allowing the screen material 14 to be designed for specific ranges of projectile types and velocities or for various ranges of impact resistance and operating environments. The fiber materials of the screen material 14 can be rigidized for certain applications by the use of epoxy materials to impregnate the fibers to form composites of various shapes and configurations.

The screen material 14 of the present invention is much stronger, lighter, and more adaptable than equivalent armor plate and can be used to provide supplemental protection to aircraft, automobiles, buses, trucks, watercraft, armored vehicles or other armored structures such as fuel tanks, as discussed above.

The screen material 14 can also be constructed from material developed by NASA to protect spacecraft from hypervelocity impacts of micrometeorites or orbital debris. The screen material 14 additionally provides protection from low velocity impacts and attempts to cut or push through by undesirable persons. For very high velocity projectiles, the first layer of the screen material 14 can fragment or partially vaporize the projectile causing the penetrating fragments to be spread over a larger area of the second layer. The process continues for each successive layer penetration until the resulting particles are rendered harmless. For lower velocity impacts, the structural integrity and flexural response of the screen materials dissipates the energy of the projectile or force applied in the form of limited motion and heat. The strength of the materials used in the screen material 14 and the weave of the fabrics and panels makes it extremely difficult for a person to cut or force his or her way through the screen material 14.

After deployment of the screen material 14, re-stowage of the screen material 14 and the weighted bar 24 into the screen housing 12 for subsequent use can be accomplished manually or with the aid of electromagnetic, pneumatic, or hydraulic actuators which retract the screen material 14 and the weighted bar 24 into the screen housing 12 ready for the next deployment event.

As discussed above, the security screen device 10 of the present invention can be utilized in many different scenarios. The examples listed below are listed as examples only and the person skilled in the art will understand that other scenarios for using the security screen device 10 are within the scope of the present invention.

Example 1

Figure 2:
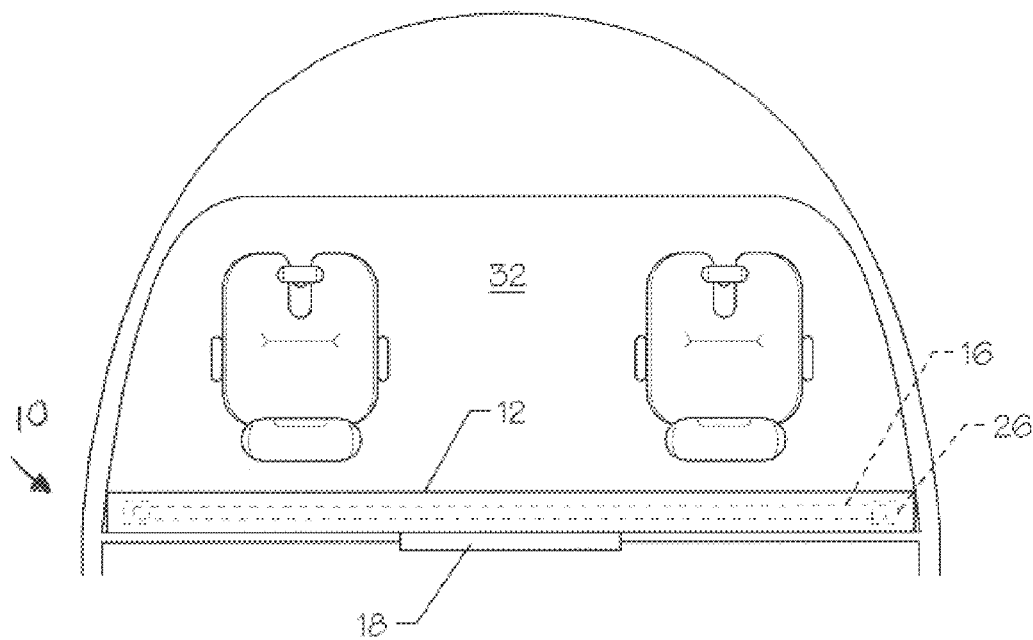
FIG. 2 is a top sectional view of the security screen device for protecting persons and property of FIG. 1, constructed in accordance with the present invention.

As illustrated in FIGS. 1 and 2, the security screen device 10 can be retrofit into an existing airliner or built into new aircraft to protect the pilot's cockpit from intrusion by hijackers. The screen housing 12 is mounted near the cockpit ceiling 28 above the cockpit door 30 extending the entire, feasible width of the aircraft's cabin. The U-shaped screen track 26 is attached to each side of the screen housing 12, extending from near cockpit floor 32 to near the cockpit ceiling 28 and can actually be used to help support the screen housing 12 to the ceiling 28 of the cockpit. The screen housing 12 and the screen track 26 are both firmly attached to aircraft structural components to provide additional structural strength. In normal circumstances, the security screen device 10 is unobtrusive, out of the way for normal access to the cockpit and much lighter than armor plating of equivalent protection.

In the event of a hijack attempt or other threatening disturbance in the aircraft's main cabin, a switch (not shown) located in the cockpit or a microphone and microprocessor in the security screen device 10 responding to specific sound profiles (gunshots, loud screams) or specific words (hijack, gun, knife, etc.) initiates an audio and/or visual alarm to the crew and deployment of the screen material 14 from the screen housing 12. The weighted bar or rod 24 at the second edge 22 of the screen material 14 drops within the side U-shaped screen track 26 and is automatically or manually locked to the floor 32 of the aircraft by a locking mechanism 34. The screen material 14, extending from the floor 32 to the ceiling 30 and effectively the full width of the cabin, blocks the hijacker's view of the cockpit and prevents entry. Because of the bullet and cutting resistance of the screen material 14, the pilots and flight controls are inaccessible to the hijackers, allowing time for emergency descent and landing. Automatic locking of the drop bar 24 to the cockpit floor 32 could be used to enforce non-negotiation security policies by preventing the pilots from opening the screen material 14, without ground crew support, in response to the hijacker's threats to harm crew and/or passengers.

Example 2

Figure 3:
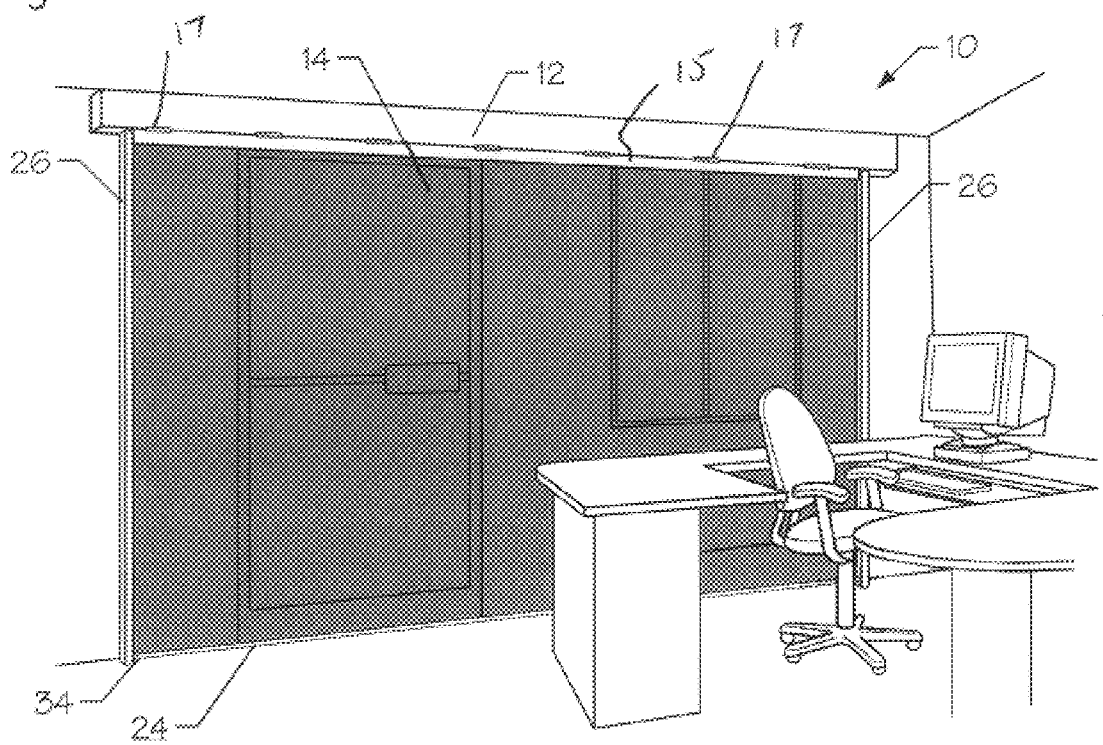
FIG. 3 is a perspective view of the security screen device for protecting persons and property, constructed in accordance with the present invention, with the security screen device being deployed in an office environment.

As illustrated in FIG. 3, the security screen device 10 of the present invention can be installed at the entryway and/or at critical doors or windows for government or business office that are at risk from any number of hazards. The screen housing 12 can be mounted above the critical areas and decorated to blend into office interior design. Actuation of dropping the screen material 14 in an emergency situation is preferably accomplished by the office burglar/fire alarm, by manual commands, or by the automatic devices built into the security screen device 10 such as audio profile recognition (gunshots, projectile acoustics, breading glass, explosion sounds) or voice recognition commands (help, gun, knife, etc.). Various deployment safety overrides (optical sensors, obstruction sensors) and warning signals would be used to prevent harm to the authorized occupants during deployment of the screen 10.

Example 3

The security screen device 10 of the present invention can be installed at the entryway or at critical doors or windows for a private residence that are at risk from any number of hazards. The screen housing can be mounted above the critical areas and decorated to blend into the residence interior design. Actuation of dropping the screen material 14 in an emergency is preferably accomplished by the residence burglar/fire alarm, by manual commands, or by the automatic devices built into the security screen device 10 such as audio profile recognition (gunshots, projectile acoustics, breaking glass, explosion sounds) or voice recognition commands (help, gun, knife, etc.). Various safety overrides (optical sensors, obstruction sensors) and warning signals can be used to prevent deployment that would present a risk to the authorized occupants during deployment of the screen 10.

Example 4

Figure 4:
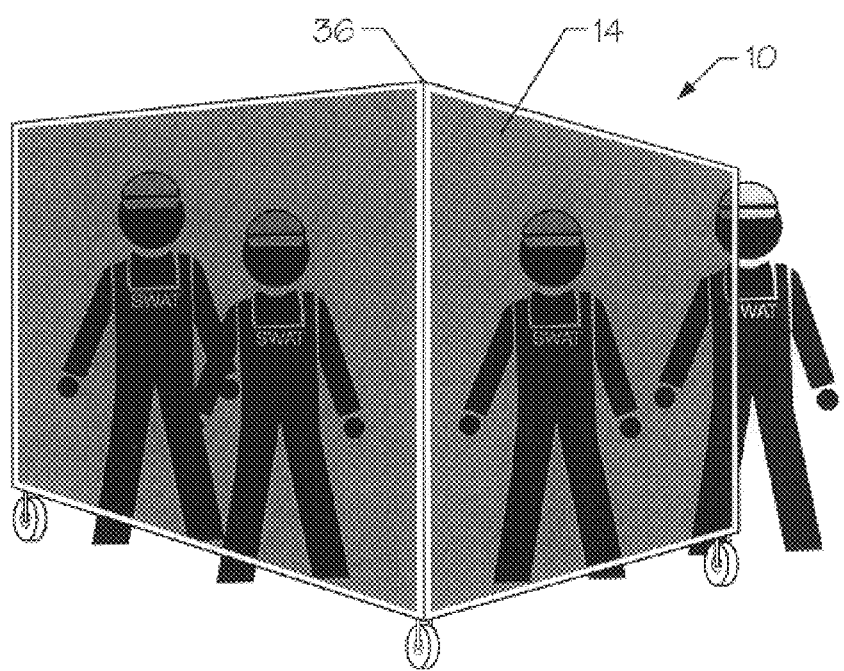
FIG. 4 is a front view of the security screen device for protecting persons and property, constructed in accordance with the present invention, with the security screen device being deployed as a movable screen.

As illustrated in FIG. 4, the security screen device 10 of the present invention can be mounted on a folding, wheeled-support structure 36 for utilization by police, SWAT teams, or military personnel to protect themselves while approaching an armed assailant. A mirror (not shown), mounted at the top of the screen material 14, could provide visibility without exposing the users to the assailant. Two or more of the security screen devices 10 could be used in conjunction to protect the users from gunfire from more than a single direction.

Example 5

Figure 5:
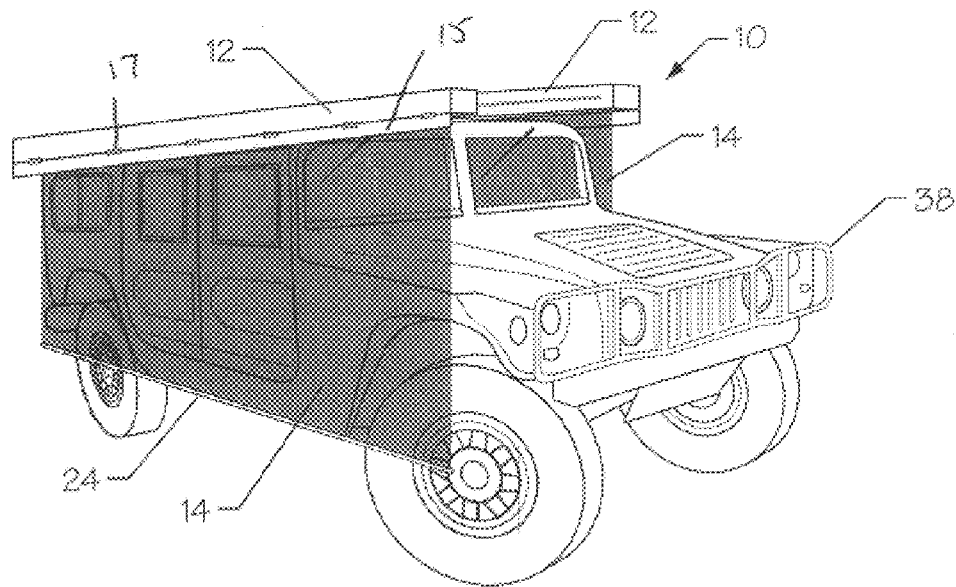
FIG. 5 is a perspective view of the security screen device for protecting persons and property, constructed in accordance with the present invention, with the security screen device being deployed on a military vehicle.

As illustrated in FIG. 5, the security screen device 10 of the present invention can be mounted and deployed on unarmored or lightly armored military vehicles 38 as required for protection of the passengers. Mirrors, more elaborate optical periscopes, or all light level video systems could provide visibility for maneuvering and gun turret control.

Example 6

The security screen device 10 of the present invention can be mounted and deployed on armored vehicles with the security screen devices 10 being mounted internally to provide additional protection to driver and passengers during emergency situations.

Example 7

Figure 6:
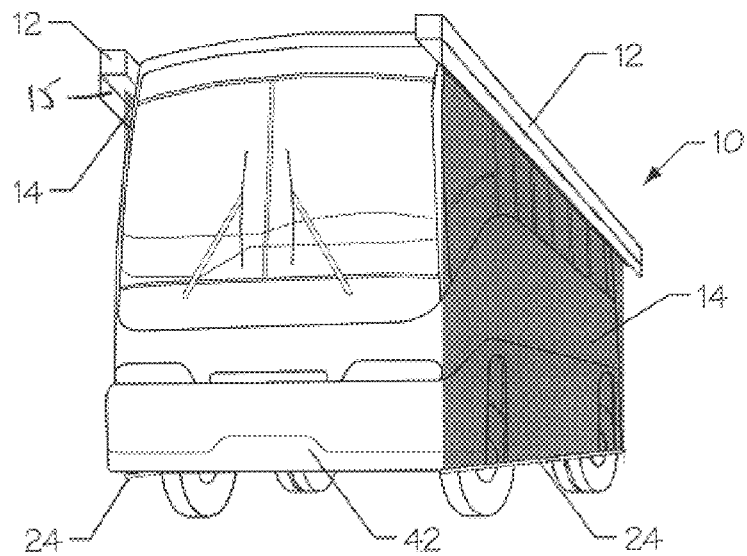
FIG. 6 is a perspective view of the security screen device for protecting persons and property, constructed in accordance with the present invention, with the security screen device being deployed on a bus.
Figure 7:
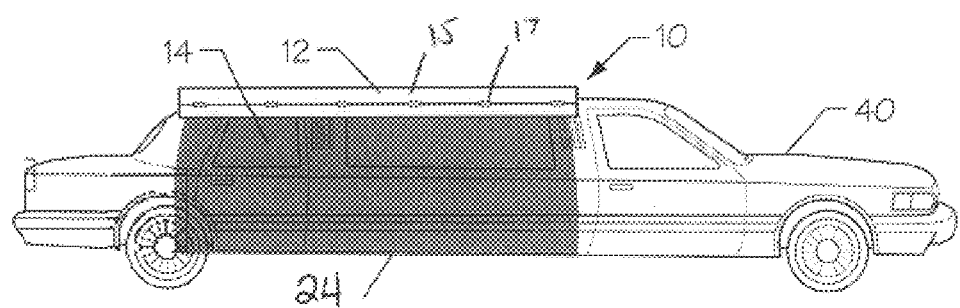
FIG. 7 is an elevational side view of the security screen device for protecting persons and property, constructed in accordance with the present invention, with the security screen device being deployed on a limousine.

As illustrated in FIGS. 6 and 7, one or more security screen devices 10 of the present invention could be mounted to the sides, front, and rear of automobiles 40 and buses 42 operating in hazardous areas and deployed as necessary for protection of the passengers. Mirrors or other devices could provide driver visibility when deployed.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A security screen device for protecting persons and property, the security screen device comprising:

an enclosed screen housing defining a screen receiving area;

a hinged door for opening the enclosed screen housing, the door being closed in an undeployed condition and the door being open in a deployed condition;

a screen material receivable within the screen housing in an undeployed condition, the screen material having a first edge and a second edge, the first edge being secured within the screen receiving area;

a weighted bar secured to the second edge of the screen material, the weighted bar being positioned inside the enclosed screen housing until being deployed; and activation means for releasing the screen material from the housing into a deployed condition such that the second edge of the screen material travels in a direction generally away from the enclosed screen housing thereby pulling the screen material from the enclosed screen housing;

wherein the activation means is a microprocessor which automatically responds to a predetermined event selected from the group consisting of physical shock, audio sound profiles like those produced by high speed projectiles, gunshots, breaking glass, and voice commands.

2. The security screen device of claim 1 wherein the screen material is stored within the enclosed screen housing in an accordion folded configuration in the undeployed condition.

3. The security screen device of claim 1 wherein the screen material is stored within the enclosed screen housing in a rolled configuration in the undeployed condition.

4. The security screen device of claim 1 wherein the screen material is constructed from a high strength material selected from the group consisting of Kevlar, carbon fiber, and glass fibers.

5. The security screen device of claim 1 wherein the weighted bar has a first end and a second end, and further comprising:

a first screen track and a second screen track mounted to the enclosed screen housing, the first end of the weighted bar slidable within the first track and the second end of the bar slidable within the second track such that during deployment of the screen material from the enclosed screen housing, the first end remains within the first track and the second end remains within the second track.

6. The security screen device of claim 5 wherein the first screen track and the second screen track have a substantially U-shaped configuration.

7. The security screen device of claim 5 and further comprising:

a locking mechanism for locking the screen material in the deployed condition.

8. A system for inhibiting persons from entering a cockpit in an aircraft, the system comprising:

a container mounted near the ceiling of the cockpit;

guide channels secured to the container adjacent the walls of the cockpit and extending from the container to near the floor of the cockpit;

a projectile resistant material receivable within the container in an undeployed condition and movable along the guide channels in a deployed condition; and activation means for manually or automatically activating the material from the undeployed condition to the deployed condition upon the occurrence of a predetermined event.

9. The system of claim 8 wherein the material is stored within the container in a manner selected from the group consisting of an accordion folded configuration and a rolled configuration.

10. The system of claim 8 wherein the material is constructed from a high strength material selected from the group consisting of Kevlar, carbon fiber, and glass fibers.

11. The system of claim 8 wherein the activation means is a microprocessor which automatically responds to a predetermined event selected from the group consisting of physical shock, audio sound profiles like those produced by high speed projectiles, gunshots, breaking glass, and voice commands.

12. The system of claim 8 wherein the material has a first edge and a second edge, the first edge being secured within the container and further comprising:

a weighted bar having a first end and a second end, the second edge of the material being secured to the weighted bar;

wherein the first end and the second end of the weighted bar travel along the guide channels.

13. The system of claim 8 wherein the guide channels have a substantially U-shaped configuration.

14. The system of claim 8 and further comprising:

a locking mechanism for locking the material in the deployed condition.

15. A method for automatically deploying a security screen upon the occurrence of a predetermined event, the method comprising:

providing a projectile resistant screen material having a first edge and a second edge;

securing the first edge of the screen material within an enclosed container;

securing the second edge of the screen material to a weighted rod, the weighted rod having a first end and a second end;

storing the screen material and a weighted rod in the enclosed container; and manually or automatically deploying the screen material from the container upon the occurrence of a predetermined event;

wherein the predetermined event is selected from the group consisting of physical shock, audio sound profiles like those produced by high speed projectiles, gunshots, breaking glass, and voice commands.

16. The method of claim 15 and further comprising:

securing a first channel and a second channel to the container;

positioning the first end of the weighted rod in the first channel;

positioning the second end of the weighted rod in the second channel;

wherein the first end of the weighted rod and the second end of the weighted rod travel through the first channel and the second channel during deployment of the screen material from the container.

17. The method of claim 15 and further comprising:

positioning the screen material within the container in a rolled or accordion-folded configuration.

18. The method of claim 15 and further comprising:

locking the weighted rod to at least the first channel upon deployment of the screen material from the container.

* * * * *